J. POINTON.
AIR IMPREGNATOR.
APPLICATION FILED OCT. 15, 1910.
1,120,848.
Patented Dec. 15, 1914.
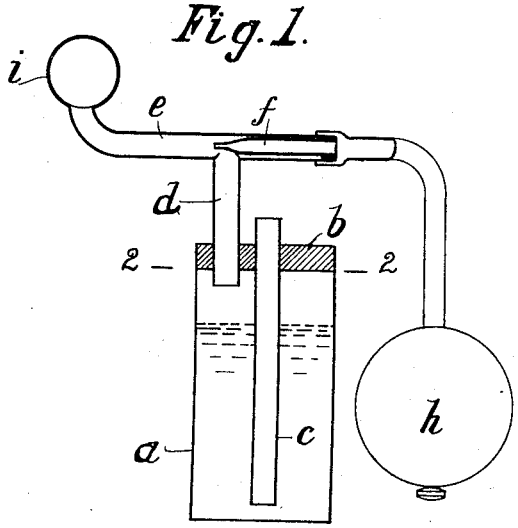
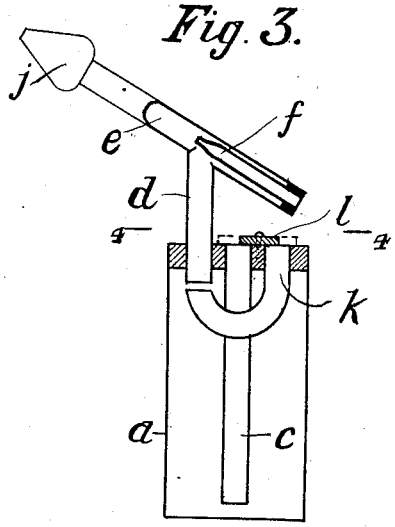
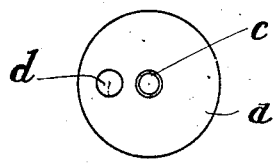
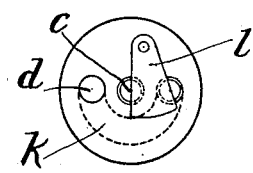
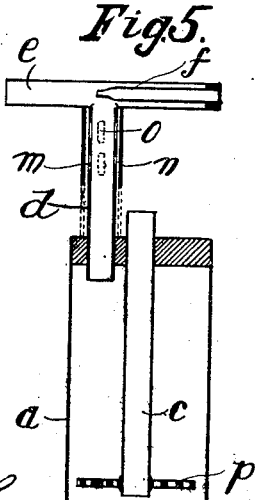
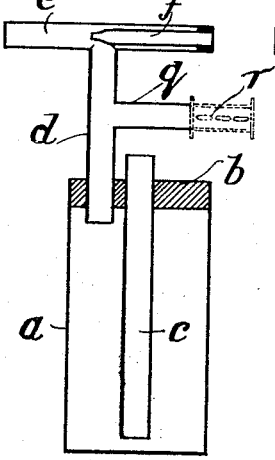
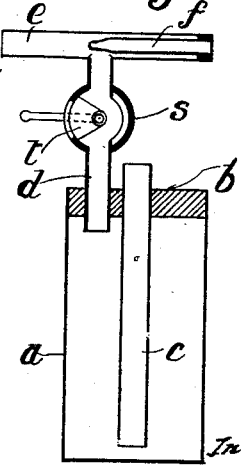
Inventor
J. Pointon.

UNITED STATES PATENT OFFICE.

JAMES POINTON, OF BIRKDALE, ENGLAND.

AIR-IMPREGNATOR.

1,120,848.  Specification of Letters Patent.  Patented Dec. 15, 1914.

Application filed October 15, 1910. Serial No. 587,267.

*To all whom it may concern:*

Be it known that I, JAMES POINTON, a subject of the King of England, residing at 147 Liverpool road, Birkdale, in the county of Lancaster, England, have invented new and useful Improvements in Air-Impregnators, of which the following is a specification.

This invention relates to methods of and means for charging air with medicaments, volatile substances, disinfectants, perfumes, and the like, and it has for one of its objects to provide an improved method of and means for effecting this purpose; and a further object is to provide means whereby the quantities of air and medicaments, or the like, may be varied at will.

By this invention, air can be charged with a vapor or volatile, medicament, and other substances, such as disinfectants, perfumes, and the like, and their relative proportions may be easily and quickly varied; while the apparatus will be found to be generally serviceable for this purpose, as well as for inhalation, and like purposes, where air charged with a vapor of ether, chloroform, or the like is required. And it will be understood that it is also serviceable for diffusing disinfectants, and the like in a room or chamber.

By the improved apparatus, air is caused to pass through a quantity of liquid medicament, or the like, contained in a closed vessel, by causing by an ejector device, a partial vacuum or the like to be formed above the medicament. The air which passes through the medicament and its vapor carried by such air passes out into the atmosphere, mixed with the air by which the partial vacuum is caused above the medicament. To vary the quantity of air mixed with the medicament, air may be caused to mix with the vapor of the medicament and its carrier air before it becomes mixed with the air issuing from the ejector.

The apparatus comprises a closed receptacle or vessel having a tube open to the atmosphere, and extending from the upper part to nearly the bottom of the vessel; and a second tube which passes upward from the upper end of the closed vessel or receptacle, its lower end being above the surface of the medicament or the like. To the upper end of this second tube is attached or fitted, another tube containing an ejector nozzle; which at one end, is fitted with means for causing air to be forced through the ejector nozzle; and at the other end with a nozzle, mixing chamber, or other means. Or it may be a plain open end, for passing the medicamentized air into the atmosphere. The second tube may be provided with means whereby air from the atmosphere can pass directly thereinto, without passing through the medicament; and this means is provided with other means for regulating the quantity of air admitted into this second tube; and such means for regulating this quantity of air may also serve to control the quantity of air passing through the medicament. The first mentioned tube, which extends into the medicament, may be provided with a perforated or porous plate or sheet, or disk, at its lower end, or at a suitable part of its length, for causing the air descending this tube, to pass through the whole of the body of the medicament as it ascends through it before reaching the second tube. It will be understood that when the medicament or the like is in the character of a liquid, the air will bubble through the same before it reaches the second tube, while if the medicament is absorbed by porous material or the like the air will become medicated or otherwise treated before it arrives at the outlet.

Apparatus constructed according to this invention, are shown in the accompanying drawings, in which—

Figure 1 is a vertical section of a simple form of apparatus. Fig. 2 is a sectional plan taken at the line 2—2 Fig. 1. Fig. 3 is a similar view to Fig. 1. Fig. 4 a sectional plan taken on the line 4—4 Fig. 3 of a modification, and Figs. 5, 6, and 7, are similar vews to Fig. 1 exhibiting further modifications under this invention.

Referring to Figs. 1 and 2 of the drawings, *a* is the container or receptacle, and *b* the seal or closure device for the same. *c* designates a tube which extends through the seal *b*, and is open at its upper end, and terminates adjacently to the bottom of the receptacle *a*. This tube may be so fitted in the seal *b* as to enable it to be adjustable, relatively to the bottom of the receptacle, and thus enable air to be medicated, disinfected, or otherwise treated, to any desired degree. *d* designates the second or outlet tube which passes through the said seal, which terminates close to the inner surface thereof. e designates the ejector tube containing a nozzle f, which terminates above the aperture leading from the second tube d into the tube e. Air is supplied to the ejector nozzle by means of the ejector tube e having at its end means for supplying air, such as a ball pump h of known form; but any other suitable known means may be employed for this purpose. To the tube e at the opposite end to that of the ball pump, is provided an outlet nozzle i, which in the form shown in Fig. 1, is of spherical shape, and serves as a chamber for mixing the air from the ejector nozzle f, and the medicated air passing from the receptacle or vessel a. The method of charging air by this apparatus consists in forcing air through the nozzle f by means of the ball pump h; and this operation causes a partial vacuum to be formed above the medicament contained in the receptacle a; and this partial vacuum causes air to enter the inlet tube c and pass through the medicament bodily to the outlet tube d, and thence to the ejector tube e, in which it comes into contact with the air issuing from the nozzle f; and the two quantities then pass into the mixing chamber i, and owing to the shape of this chamber i, these two quantities become intimately mixed with each other, and issue therefrom to the atmosphere equally medicated.

Referring to Fig. 3, the parts a, b, c, and d, are similar to those shown in Figs. 1 and 2, while the ejector tube e is shown at an acute angle to the tube d, and is provided at its discharge end with a nozzle j. In this modification is provided a second air inlet tube or by-pass k which is arranged within the receptacle, and has one end disposed below or in proximity to the outlet tube d; and this tube or by-pass k serves to admit air direct to the tube d without the same passing through the medicament or the like. This second tube k is provided with means for regulating the inlet aperture thereof, the means shown comprising a pivoted valve plate l, by the movement of which, the opening of the inlet aperture can be varied. This valve may also serve for controlling the opening of the inlet of the tube c, and thus control the supply of air passing through the medicament; and where the valve is constructed as shown in the drawings, this valve serves to control the inlet of both the tube c and tube k.

Referring to the modification shown in Figs. 5, 6 and 7, that exhibited in Fig. 5 consists in providing the outlet tube d with apertures m and a sleeve n provided with holes o, which, when the sleeve is in one position, coincide with the apertures m; and when in another position, no connection exists between the two; and thus, when in this second position, the orifices m are closed. By this means the admission of air to the outlet tube d, and the quantity mixed with the medicated air can be varied as desired. In this Fig. 5 is illustrated a perforated plate p attached to the lower end of the air inlet tube c, and this air inlet plate serves to equally distribute the air through the medicament contained in the receptacle a.

In Fig. 6 is shown a further modification of a means for controlling the admission of air from the atmosphere to the outlet tube d. This means is of similar construction to that described with reference to Fig. 5, with the exception that the tube q is attached to the tube d, and is provided with a short cap r shown in dotted lines, the walls of such cap being provided with holes whereby air is admitted into the tube q, and the outlet tube d. According to the number of holes in this cap r, so will be the fineness of regulation of air from the atmosphere to the tube d.

The modification shown in Fig. 7 comprises the forming of an enlarged portion on the tube d, such as a valve chamber s, and fitting a pivotally mounted valve t therein which serves to control an aperture in this valve casing s; and according to the amount of opening of this aperture so will be the amount of air admitted to the outlet tube d.

By the above means it will be obvious that medicated, disinfected, perfumed, and other similarly treated air may be obtained to any strength desired, or any degree of strength required; and thus enable such an apparatus to be used for any purpose for which it may be found useful, such as for inhalation, disinfecting or medicating purposes.

What is claimed is:—

1. An air impregnator comprising a closed receptacle, means for admitting air into the receptacle in the vicinity of the bottom thereof, an outlet tube connected with the receptacle, and out of contact with the contents of the receptacle, an ejector tube containing a nozzle, and mounted upon and communicating with the outlet tube, and disposed transversely with relation to the same with the nozzle disposed over the outlet tube, and means connected with the ejector tube at the opposite end to that at which the impregnated air is delivered to the atmosphere, for forcing air through the nozzle across the top of the outlet tube in the ejector tube.

2. An air impregnator comprising a closed receptacle, means for leading air into the receptacle and discharging the same in the vicinity of the bottom thereof, an outlet tube connected with the receptacle, an ejector tube connected to the upper end of the outlet tube and disposed transversely with relation to the same, a nozzle located in the ejector tube and having its discharge end above the outlet tube and means for admitting external air into the outlet tube below the discharge end of the nozzle.

In testimony whereof I have signed my name to this specification in the presence of two subscribing witnesses.

JAS. POINTON.

Witnesses:
SOMERVILLE GOODALL,
WILLIAM F. PARRY.